UNITED STATES PATENT OFFICE.

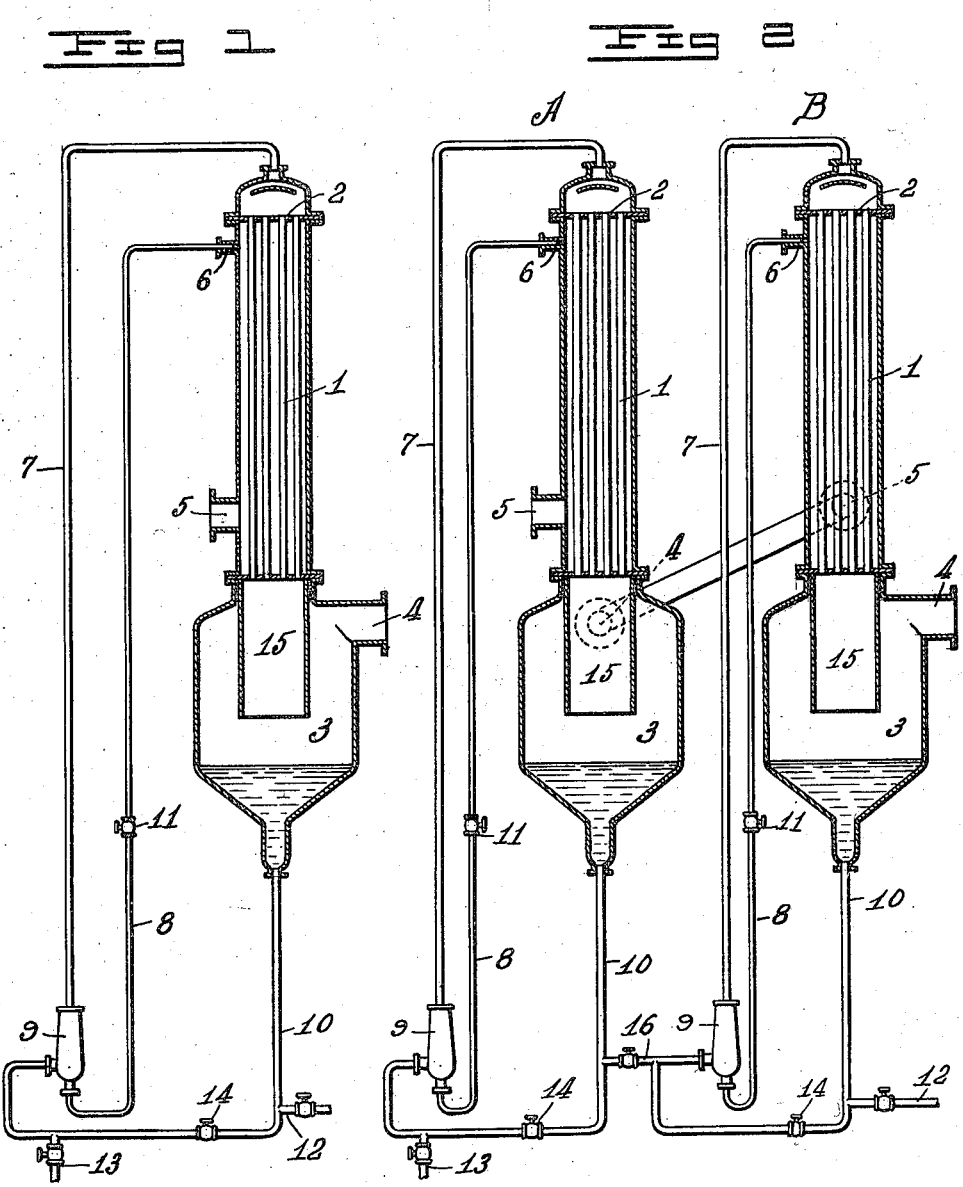

PAUL KESTNER, OF LILLE, FRANCE, ASSIGNOR TO KESTNER EVAPORATOR COMPANY, OF PHILADELPHIA, PENNSYLVANIA, A CORPORATION OF PENNSYLVANIA.

EVAPORATING APPARATUS.

1,060,607. Specification of Letters Patent. Patented May 6, 1913.

Application filed September 11, 1912. Serial No. 719,810.

*To all whom it may concern:*

Be it known that I, PAUL KESTNER, a citizen of the Republic of France, residing at Lille, in the Department of Nord, France, have invented certain new and useful Improvements in Evaporating Apparatus, of which the following is a specification.

This invention relates to evaporating apparatus; and it comprises an evaporator operating in downward flow of the liquid to be concentrated and having a heating jacket surrounding the evaporating elements, a liquid distributing device near or at the top of the evaporator, a conduit for liquid communicating with said distributing device and a connection between said heating jacket and said conduit enabling utilization of fluid from said jacket in elevating liquid through said conduit to said distributing device, and, more specifically, a vertical tube evaporator having a plurality of vertical tubes within a heating casing, a distributer for liquid at the top of said tubes and a separator for liquid and vapor at the bottom of said tubes, a feed conduit for the distributer and a pipe connection between the heating jacket and the conduit for facilitating the passage of liquid upward through said conduit; all as more fully hereinafter described and as claimed.

In the operation of vacuum pans and other evaporators where evaporation is performed in a downward passage of the liquid and where liquid is fed to the top of the apparatus, it is customary to supply, or help supply, the feed of the liquid by the aid of a pump. Heating is ordinarily done by steam, live or exhaust as the case may be, or by vapor from a preceding effect, fed into heating element. As heat is conveyed through a metal wall to the liquid to be evaporated, the heat and, consequently, the pressure are invariably greater in the heating element than in the evaporating element. The steam or vapor, as the case may be, always carries more or less air or other permanent gases which accumulate in the heating element, not being subject to condensation in the heating operation; and it is customary to provide means for removing the gas. Ordinarily there is an air exit at a point remote from the point of entry of the steam or vapor, and through this exit, which is normally open, escape not only the air and other permanent no-condensable gases but a certain amount of steam or vapor mixed therewith, which are lost. Generally, but not necessarily, in these downwardly operating evaporators, evaporation is performed within vertically placed tubes surrounded by and inclosed in a heating casing or jacket. Occasionally, the heating fluid is conveyed through tubes or pipes, horizontally or vertically placed, over which the liquid trickles or passes downwardly. I have found that the gas in the heating elements, with or without a certain amount of the heating fluid itself, may be usefully employed in propelling, or facilitating the propulsion, of the liquid to the top of the evaporator. Where pans or evaporators are placed in multiple effect, the difference in pressure between succeeding effects tends to cause a feed in the desired direction; and the same is true of a single effect working under vacuum or suction. But this difference in pressure, or suction, is often not sufficient to cause as rapid and copious a feed as is desirable; and this is particularly true where the evaporator is of comparatively great height; as in modern types of evaporators transmitting liquid as downwardly flowing films through tubes of comparatively great height. In the present invention this air or gas, together with more or less vapor is so utilized in transmitting liquid to the top of the evaporator. The air, or gas, or vapor so employed for propulsion may be directly supplied into the current of liquid. As the effect or evaporator is invariably working under less pressure than prevails in its heating elements, no condensation of any of this steam or vapor can take place in the evaporator so supplied. The fluid, whether permanent gas or steam or vapor, or a mixture, will go forward with the liquid to be evaporated and will mingle with the vapors of such liquid, being removed with such vapors. Advantageously the fluid tapped from the heating element to assist in the flow of liquid through a conduit to the top of the evaporating element is used in an injector-like device. It should be supplied to the lowest point in such conduit which conditions permit. As stated, there is no reason why the fluid should not be contacted with the liquid; and furthermore this enables a good utilization of its contained heat. The fluid may of course be employed in a motor operating a pumping device; but this is not so advantageous.

Although the described invention in feeding devices may be used in any vertical type evaporator using downward flow, it is particularly adapted to a type having a plurality of comparatively long narrow vertical tubes passing through a heating casing and provided with a common feed for all such tubes (or a group of tubes), and discharging at their base into a particular separating chamber for liquid and vapor, having means at the base for withdrawing liquid so separated.

In the accompanying illustration I have shown, more or less diagrammatically, certain embodiments of the described invention. In this showing, Figure 1 is a view, partly in vertical section, of a single evaporator or effect, having the liquid feed device described and of the type described; and Fig. 2 is a similar view of a plurality of such effects (two are shown) in multiple effect arrangement.

In the showing of Fig. 1, element 1 is a nest of comparatively narrow long vertical tubes communicating at their top with distributing chamber 2 and at their base with separating chamber 3 for liquid and vapor. Outlet 4 provides for removal of separated vapor. The tubes are surrounded by a casing provided with inlet 5 for steam or heating vapor and having an outlet at an upper point 6 for removal of gas, or gas and vapor. Feed conduit 7 supplies liquid to the distributing chamber. From the outlet for gas and vapor, a pipe 8 leads to an injector-like device 9 in the feed conduit. As shown in Fig. 1, this feed conduit may be supplied in part by pipe 10 with liquid which has already passed through the apparatus. Valve 11 in the pipe from the gas outlet allows control of the removal of gas and vapor and of the propulsion of liquid. Concentrated liquid may be removed from the system by valved pipe 12 and fresh liquid may be introduced through valved pipe 13. Valve 14 permits control of the relative proportion of concentrated liquid returned to mingle with fresh liquid. With this arrangement, whatever the rate or manner of introduction of fresh liquid and removal of finished liquid from the evaporator, a sufficient amount of liquid can be maintained in the evaporator at all times to keep the evaporating surfaces efficiently covered. In the liquid separating chamber a depending baffle, 15, which may be spiral in section, may be used to prevent entrainment. In the structure of Fig. 2, two such effects, A and B, are combined to form an apparatus operating in double effect. In this structure the two evaporators are, or may be, exactly the same as the single effect of Fig. 1. As shown, like elements have like reference characters. There is a valved cross-over 16 which allows the thickened liquid from A to be fed to B in any desired proportion.

In the operation of the structure of Fig. 1, fresh liquid is introduced through 13 while finished liquid is removed through 12. By suitably opening valve 14, any desired proportion of once-treated liquid may, if desired, be admixed with fresh inflowing liquid. By suitably opening valve 11, air and, usually, some vapor from 6 pass into 9, giving up whatever superheat they may have, and force the liquid upwardly through 7 to distributer 2. This forcing may be done in part by the live force of the air and vapor, and for this reason element 9 is advantageously an injector; but in large part it is also accomplished by the tendency of the air to rise in 7, taking up the liquid with it in the way familiar in air-lift pumps. Ordinarily the effect is under the influence of suction-inducing means connected to 4 and the liquid tends to rise in 7 for this reason while the injection of air and vapor from the heater casing tends to lighten the liquid column and make the suction more effective. The air and vapor passing with the liquid into the distributer join the vapor produced in the downward passage of the liquid through tubes 1. Arriving at the base of the tubes in expansion chamber 3, the liquid and vapor (and air) are separated; the former settling to the bottom whence it is drawn off through 10. The vapor and gas pass to exit through 4. An apparatus of this type may be used continuously or discontinuously. In the former event, fresh liquid is always entering through 13 and finished liquid passing to exit through 12. If valve 14 be closed, no finished liquid will join the fresh liquid; if it be partly opened any desired fraction of the thickened liquid may be admixed with the fresh incoming liquid. If it be used discontinuously, valve 14 may be opened and sufficient liquid allowed to enter through 13 to give the desired amount or volume in the apparatus. Then the feed may be discontinued or lessened. As the liquid diminishes in volume, more may be allowed to enter through 13 from time to time, or continuously; and after the concentration is complete, the apparatus may be discharged through 12.

The operation in the multiple effect of Fig. 2 may be much the same, except that finished liquid is continuously sent in some proportion from A to B. By closing valves 14 in the appropriate connections of A and B, the liquid may merely pass through the apparatus without a return through the same effect. Ordinarily in working in multiple effect, since the volume of liquid, with the same feed, is greater in the first effect than in the second, and in the second than in the third, etc., it is better to use the return feed (past 14) more in the later effects than in first. If the valves 14 be kept closed and 16 be kept open, the apparatus of Fig. 2 operates in ordinary multiple effect, without return of liquid through the same effect. Air or gas from another source may be mingled with the liquid in conduit 7 to give the air-lift effect but since the gas in the heating jacket must be disposed of, it is better to use it. This enables the lifting effect to be secured without cost and, in the case of high evaporators, permits dispensing with a special liquid pump for each effect which must, ordinarily, otherwise be used. By using the return flow connection past valve 14 not only is an efficient covering of the heating surfaces permitted, but the further advantage is secured that circulation through the apparatus may be made much more rapid than would correspond to a single passage of liquid. Other things being equal, the more rapid the flow of a liquid over a heating surface, the more efficient is the absorption of heat; and with the present device the flow may be made as rapid as may be desired without interference with the normal flow of fresh liquid to and finished liquid from the apparatus.

What I claim is:—

1. In evaporating apparatus, heating and evaporating elements, a chamber at or near the top of the apparatus distributing liquid to said evaporating elements, a chamber near the base of the apparatus for receiving evaporated liquid, a conduit supplying liquid to the distributing chamber and a pipe connection between the top of the heating element and a point in said conduit.

2. In evaporating apparatus, heating and evaporating elements, a chamber at or near the top of the apparatus distributing liquid to said evaporating elements, a chamber near the base of the apparatus for receiving evaporated liquid, a conduit supplying liquid to the distributing chamber and a pipe connection between the top of the heating element and a point in said conduit, said point being provided with an injector device into which said pipe connection enters.

3. In evaporating apparatus, heating and evaporating elements, a chamber at or near the top of the apparatus distributing liquid to said evaporating elements, a chamber near the base of the apparatus for receiving evaporated liquid, a conduit supplying liquid to the distributing chamber, a pipe connection between the top of the heating element and a low point in said conduit and a pipe connection for evaporated liquid connecting said receiving chamber for evaporated liquid and said conduit.

4. In evaporating apparatus, heating and evaporating elements, a chamber at or near the top of the apparatus distributing liquid to said evaporating elements, a chamber near the base of the apparatus for receiving evaporated liquid, a conduit supplying liquid to the distributing chamber, a pipe connection between the top of the heating element and a point in said conduit, said point being provided with an injector device into which said pipe connection enters, and a pipe connection for evaporated liquid connecting said receiving chamber for evaporated liquid and said conduit.

5. In an evaporating apparatus, a plurality of vertical evaporating tubes, a surrounding heating casing, a distributing chamber for liquid above and supplying said tubes, a chamber at the base for evaporated liquid, a conduit for incoming liquid supplying said distributing chamber and a pipe connection between said heating casing and a point in said conduit.

6. In an evaporating apparatus, a plurality of vertical evaporating tubes, a surrounding heating casing, a distributing chamber for liquid above and supplying said tubes, a chamber at the base for evaporated liquid, a conduit for incoming liquid supplying said distributing chamber and a pipe connection between said heating casing and a point in said conduit, said point being provided with an injector device into which said pipe connection enters.

7. In an evaporating apparatus, a plurality of vertical evaporating tubes, a surrounding heating casing, a distributing chamber for liquid above and supplying said tubes, a chamber at the base for evaporating liquid, a conduit for incoming liquid supplying said distributing chamber, a pipe connection between said heating casing and a point in said conduit, and a connection for evaporated liquid between said receiving chamber and said conduit.

8. In an evaporating apparatus, a plurality of vertical evaporating tubes, a surrounding heating casing, a distributing chamber for liquid above and supplying said tubes, a chamber at the base for evaporated liquid, a conduit for incoming liquid supplying said distributing chamber, a pipe connection between said heating casing and a point in said conduit, said point being provided with an injector device into which said pipe connection enters, and a connection for evaporated liquid between said receiving chamber and said conduit.

9. In an evaporator, a plurality of vertical evaporating tubes, a heating casing surrounding the same, a distributer chamber for liquid above and supplying the tubes, a separating chamber of comparatively large volume at the base of the tubes, a conduit for liquid connected to said distributing chamber, a pipe connection between said heating jacket and said conduit, and a pipe connection between the base of said separating chamber and said conduit.

10. In an evaporating apparatus, means for evaporating liquid in downward transit, heating means for the same adapted to receive fluid under pressure and means operated by fluid withdrawn from said heating means for transmitting liquid to the top of the apparatus preparatory to such downward transit.

In testimony whereof, I affix my signature in the presence of two subscribing witnesses.

PAUL KESTNER.

Witnesses:
J. LEBEY,
A. W. KORBY.